Jan. 10, 1928.
J. L. DRAKE
1,656,103
COOLER FOR SHEET GLASS APPARATUS
Filed March 2, 1927
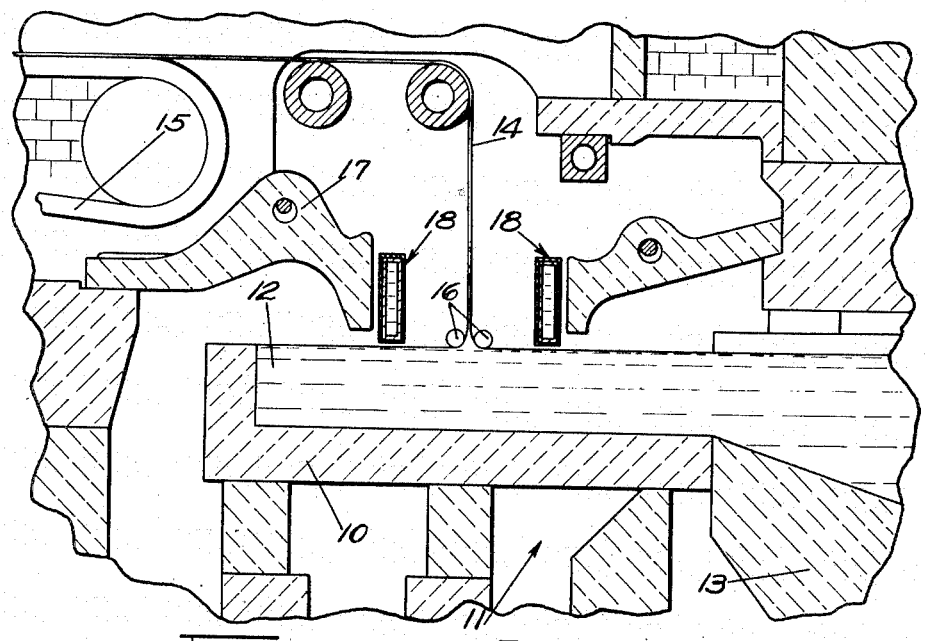
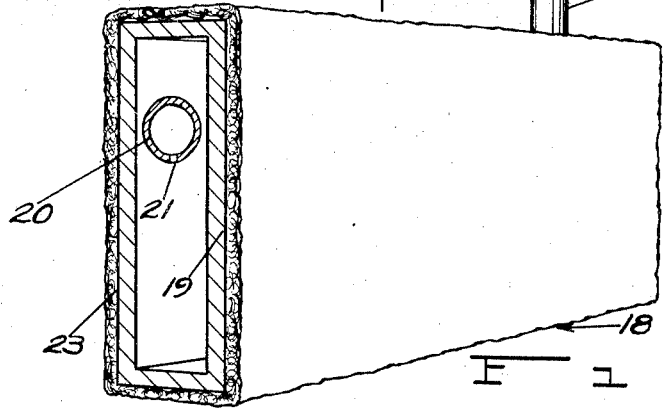
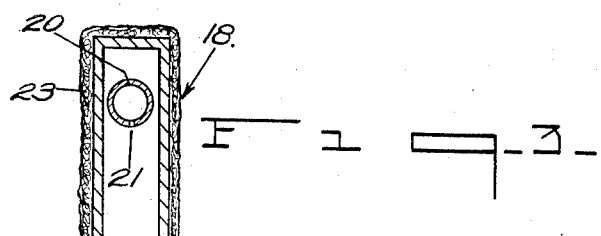
Inventor
John L. Drake
By Frank Fraser,
Attorney Patented Jan. 10, 1928.

1,656,103

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

COOLER FOR SHEET-GLASS APPARATUS.

Application filed March 2, 1927. Serial No. 171,959.

This invention relates to improvements in sheet glass apparatus, and has more particular reference to a novel form of cooler for association therewith.

In certain processes for drawing sheet glass such as that disclosed in the patent to Colburn 1,248,809, granted December 4, 1917, a pair of coolers are arranged at opposite sides of the sheet and relatively close to the surface of the molten glass from which the sheet is drawn to absorb sufficient heat to permit the drawing of a good sheet of glass.

Certain types of these coolers are so constructed that drops of moisture will condense upon the outer surface of the walls thereof, and this condensation causes the coolers to rust. Not only do the drops of moisture from condensation fall down into the molten glass from which the sheet is being drawn, but also the rust formed as a result of this condensation frequently falls down into the said glass, and subsequently finding its way into the sheet produces defects therein. Again, in other coolers, the condensation of moisture forms a film upon the outer surface of the walls thereof so that it becomes necessary that these coolers be frequently cleaned in order to remove this film. Also, when these coolers are originally placed in the machine or after they have been cleaned to remove the above mentioned film or rust therefrom, the surfaces thereof are bright and shiny. Frequently, unburnt gases escaping from the furnace and heating chamber ignite to form a flame as they reach the atmosphere, and it has been found that this flame plays upon or licks the coolers and especially the bottoms thereof causing blue spots thereon. Inasmuch as blue or any other dark color will absorb more heat than will a bright shiny surface, it will be apparent that un-uniform heat absorption from the molten glass passing under the cooler will naturally result.

An important object of the invention is to provide an improved cooler so constructed that drops of moisture will be prevented from forming upon the outer surface of the walls thereof.

Another object of the invention is to provide such an improved cooler of this nature which will permit of a greater and more uniform heat absorption.

A further object of the invention is to provide such an improved cooler of this nature including means for absorbing any moisture which might condense thereon.

A still further object of the invention is to provide such an improved cooler of this nature including means for protecting the same to prevent discoloring thereof from flames playing thereon.

Other objects and advantages of the invention will become more apparent during the course of the following description when taken in connection with the accompanying drawings.

In the drawings wherein like numerals are employed to designate like parts throughout the same, Fig. 1 is a longitudinal vertical section through a portion of sheet glass drawing apparatus showing associated therewith, in cross section, a pair of coolers constructed in accordance with the present invention, Fig. 2 is a perspective sectional view of one of the improved coolers, and Fig. 3 is a sectional view of a slightly modified type of cooler.

Referring now more in detail to the accompanying drawings, the numeral 10 generally designates a receptacle or draw pot supported above a heating chamber 11 and containing a supply of molten glass 12 which is continuously supplied thereto from a suitable furnace 13. A sheet of glass 14 is drawn from the molten glass 12 in the receptacle by means of the drawing mechanism 15.

To maintain the sheet to width, knurled rollers 16, or similar means, are arranged at opposite sides of the sheet at both edges thereof, and are driven at a speed to enable a relatively heavy knurled edge to be formed on said sheet which is capable of holding the same to width. Arranged above the receptacle 10 are cover or lip tiles 17 which tend to force any heat currents escaping from the heating chamber 11 or furnace 13 downwardly onto the surface of the molten glass 12.

Positioned at each side of the sheet 14 and immediately adjacent the surface of the molten glass 12 are the improved coolers 18 which serve to protect the sheet from heated air escaping from the furnace and heating chamber and at the same time aid in absorbing sufficient heat from the molten glass passing thereunder to give it the proper viscosity to permit it to be drawn away in sheet form.

The improved coolers are identical in construction so that a detail description of only one of them is thought to be necessary. Each cooler comprises a hollow elongated casing 19 preferably constructed from a suitable metal, and which casing may be substantially rectangular in cross section, as shown, or which may be of any other form desired. The cooler is adapted to be internally cooled by circulating a suitable cooling medium such as water therethrough. This cooling medium is adapted to enter through the pipe 20 extending longitudinally within the casing 19 and pass from the said pipe through a plurality of openings 21 therein into the said casing. As it becomes heated, the cooling medium passes upwardly and exteriorly of the cooler through the pipe 22.

As stated above, certain types of these coolers are so constructed that drops of moisture will condense upon the outer surfaces thereof, and which condensation is injurious to the production of a good sheet of glass. Also, that the surfaces of the coolers and especially the bottoms thereof frequently become discolored from gas flames playing thereupon. To overcome these disadvantages, the walls of the metallic casing 19 are covered with a covering 23 preferably of asbestos, although it may be of any other suitable fibrous material.

This covering 23 consists preferably of one or more thicknesses of asbestos paper of the kind ordinarily used in the covering of furnace pipes, but it is not to be of such a thickness that it will act as an insulator. It has been found by experiments that an ordinary furnace pipe covered with one or two thicknesses of this asbestos paper will lose more heat than will a smooth shiny pipe.

This asbestos covering 23 is adapted to accomplish three distinct purposes. In the first place, due to its porous nature, it will serve to absorb any moisture which might condense upon the outer surface of the walls of the casing 19 and thus prevent drops of moisture from forming thereon. Secondly, due to the porous nature of the covering, a greater heat absorption will occur, and thirdly, since the bottom of the cooler is also covered, it will not be subjected to discoloring from flames playing thereupon, and this will result in a more uniform as well as a greater heat absorption from the molten glass passing thereunder.

In the form of the invention shown in Fig. 3, the asbestos covering 23 covers only the top of the casing 19 and a greater portion of the side walls thereof but does not extend quite down to or cover the bottom thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a cooling member, and means for preventing moisture from forming in drops thereon.

2. In sheet glass apparatus, a cooling member, and means for absorbing moisture which condenses thereon.

3. In sheet glass apparatus, a cooling member, and means for protecting the same to prevent discoloring thereof when subjected to the direct action of flames.

4. In sheet glass apparatus, a cooling member, and a covering therefor for preventing moisture from forming in drops thereon.

5. In sheet glass apparatus, a cooling member, and a covering therefor for absorbing moisture which condenses thereon.

6. In sheet glass apparatus, a cooling member, and a covering therefor to protect the same to prevent discoloring thereof when subjected to the direct action of flames.

7. In sheet glass apparatus, a cooling member, and a fibrous covering therefor.

8. In sheet glass apparatus, a cooling member, and an asbestos covering therefor.

9. A cooler adapted for use in sheet glass apparatus, comprising a hollow metallic casing, and a fibrous covering for said casing.

10. A cooler adapted for use in sheet glass apparatus, comprising a hollow metallic casing, and an asbestos covering for said casing.

11. A cooler adapted for use in sheet glass apparatus, comprising a hollow metallic casing, an asbestos covering for said casing, and means for circulating a cooling medium through said casing.

12. The combination with a receptacle containing a mass of molten glass, and means for drawing a sheet therefrom, of coolers arranged at opposite sides of said sheet closely adjacent the surface of the molten glass, each comprising a hollow metallic casing, and a covering for said casing.

13. The combination with a receptacle containing a mass of molten glass, and means for drawing a sheet therefrom, of coolers arranged at opposite sides of said sheet closely adjacent the surface of the molten glass, each comprising a hollow metallic casing, and a fibrous covering for said casing.

14. The combination with a receptacle containing a mass of molten glass, and means for drawing a sheet therefrom, of coolers arranged at opposite sides of said sheet closely adjacent the surface of the molten glass, each comprising a hollow metallic casing, a asbestos covering for said casing, and means for circulating a cooling medium through said casing.

15. The combination with a receptacle containing a mass of molten glass, and means for drawing a sheet therefrom, of coolers arranged at opposite sides of said sheet closely adjacent the surface of the molten glass, each comprising a hollow metallic casing, and an asbestos covering for said casing.

Signed at Toledo, in the county of Lucas and State of Ohio, this 26th day of February 1927.

JOHN L. DRAKE.